US011418934B2

(12) United States Patent
Bhaskaran et al.

(10) Patent No.: US 11,418,934 B2
(45) Date of Patent: *Aug. 16, 2022

(54) PREDICTIVE FLOW SWITCHING AND APPLICATION CONTINUITY IN CONNECTED VEHICLE NETWORKS

(71) Applicant: ASPEN NETWORKS, INC., Santa Clara, CA (US)

(72) Inventors: Sajit Bhaskaran, Sunnyvale, CA (US); John Tong-Kin Yu, Sunnyvale, CA (US)

(73) Assignee: ASPEN NETWORKS, INC., Santa Clara, CA (US)

( * ) Notice: Subject to any disclaimer, the term of this patent is extended or adjusted under 35 U.S.C. 154(b) by 16 days.

This patent is subject to a terminal disclaimer.

(21) Appl. No.: 17/076,442

(22) Filed: Oct. 21, 2020

(65) Prior Publication Data

US 2021/0044946 A1  Feb. 11, 2021

Related U.S. Application Data

(63) Continuation of application No. 15/951,050, filed on Apr. 11, 2018, now Pat. No. 10,848,936.

(60) Provisional application No. 62/484,491, filed on Apr. 12, 2017.

(51) Int. Cl.
| | | |
|---|---|---|
| *H04W 4/40* | (2018.01) | |
| *H04W 76/14* | (2018.01) | |
| *G06F 16/29* | (2019.01) | |
| *H04L 67/12* | (2022.01) | |
| *H04W 88/16* | (2009.01) | |
| *H04W 84/00* | (2009.01) | |

(52) U.S. Cl.
CPC ............. *H04W 4/40* (2018.02); *G06F 16/29* (2019.01); *H04W 76/14* (2018.02); *H04L 67/12* (2013.01); *H04W 84/005* (2013.01); *H04W 88/16* (2013.01)

(58) Field of Classification Search
CPC ....... H04W 4/40; H04W 76/14; H04W 88/16; H04W 84/005; G06F 16/29; H04L 67/12
See application file for complete search history.

(56) References Cited

U.S. PATENT DOCUMENTS

| | | |
|---|---|---|
| 7,620,037 B1 | 11/2009 | Bhaskaran et al. |
| 8,009,554 B2 | 8/2011 | Chin et al. |
| 8,938,544 B2 | 1/2015 | Wakikawa et al. |
| 2008/0155070 A1* | 6/2008 | El-Damhougy ...... G06F 15/177 709/220 |

(Continued)

*Primary Examiner* — Jianye Wu
(74) *Attorney, Agent, or Firm* — Womble Bond Dickinson (US) LLP

(57) ABSTRACT

The subject disclosure relates to ways to ensure vehicle network connectivity. In some aspects, a process of the technology includes steps for receiving local network measurement data including one or more connectivity metrics for at least one network provider (e.g., an ISP), and updating a geo-connectivity database using the received local network measurement data. In some aspects, the process can include additional steps for transmitting a geo-connectivity request to a remote Intelligent Vehicle Connectivity Analytics (IVCA) gateway, and for receiving a geo-connectivity reply from the remote IVCA gateway, the geo-connectivity reply including information regarding network availability for the at least one network provider along a vehicle path. Systems and machine-readable media are also provided.

3 Claims, 10 Drawing Sheets

(56) References Cited

U.S. PATENT DOCUMENTS

2013/0238807 A1\* 9/2013 Wakikawa ............ H04W 48/18
709/227

\* cited by examiner

PREDICTIVE FLOW SWITCHING AND APPLICATION CONTINUITY IN CONNECTED VEHICLE NETWORKS

CROSS-REFERENCE TO RELATED APPLICATIONS

This application is a continuation of U.S. application Ser. No. 15/951,050, filed Apr. 11, 2018, entitled "Predictive Flow Switching and Application Continuity in Connected Vehicle Networks", which claims priority to U.S. Provisional Application No. 62/484,491, filed Apr. 12, 2017, entitled "Predictive Flow Switching and Application Continuity in Connected Vehicle Networks", all of which are herein incorporated by reference in their entirety.

BACKGROUND

1. Technical Field

The subject technology relates to systems and methods for performing intelligent flow switching across different provider networks ("provider paths") for a network connected vehicle.

2. Introduction

Wireless communication technologies are increasingly being deployed in vehicles, including, but not limited to: cars, motorcycles, trains, and boats etc. Vehicle connectivity is useful for enabling a variety of communication and entertainment applications, such as for supporting telephone, navigation, and streaming media applications.

BRIEF DESCRIPTION OF THE DRAWINGS

Certain features of the subject technology are set forth in the appended claims. However, the accompanying drawings, which are included to provide further understanding, illustrate disclosed aspects and together with the description serve to explain the principles of the subject technology. In the drawings:

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form in order to avoid obscuring the concepts of the subject technology.

1.0 Overview

As vehicles (e.g., cars, boats, ships, aero planes, etc.), become more intelligent with multiple computing devices installed or present in them, they also require network connectivity while on the move. In the current state of the art there are various wireless network options e.g., 4G, LTE, 5G, Satellite networks, IEEE 802.11a/b/g/n networks, and Dedicated Short-Range Communications (DSRC) IEEE 802.11p networks, etc. for connecting vehicles on the move—all of which come with various benefits and limitations. Cities and states are now considering building smart infrastructure based on V2V (vehicle-to-vehicle), V2I (vehicle-to-infrastructure), and V2P (vehicle-to-pedestrian)— and there are several candidate technologies for these new V2X deployments—including DSRC and Cellular V2X based on 5G standards being developed by the Global System for Mobile Association (GSMA).

Figure 1A:
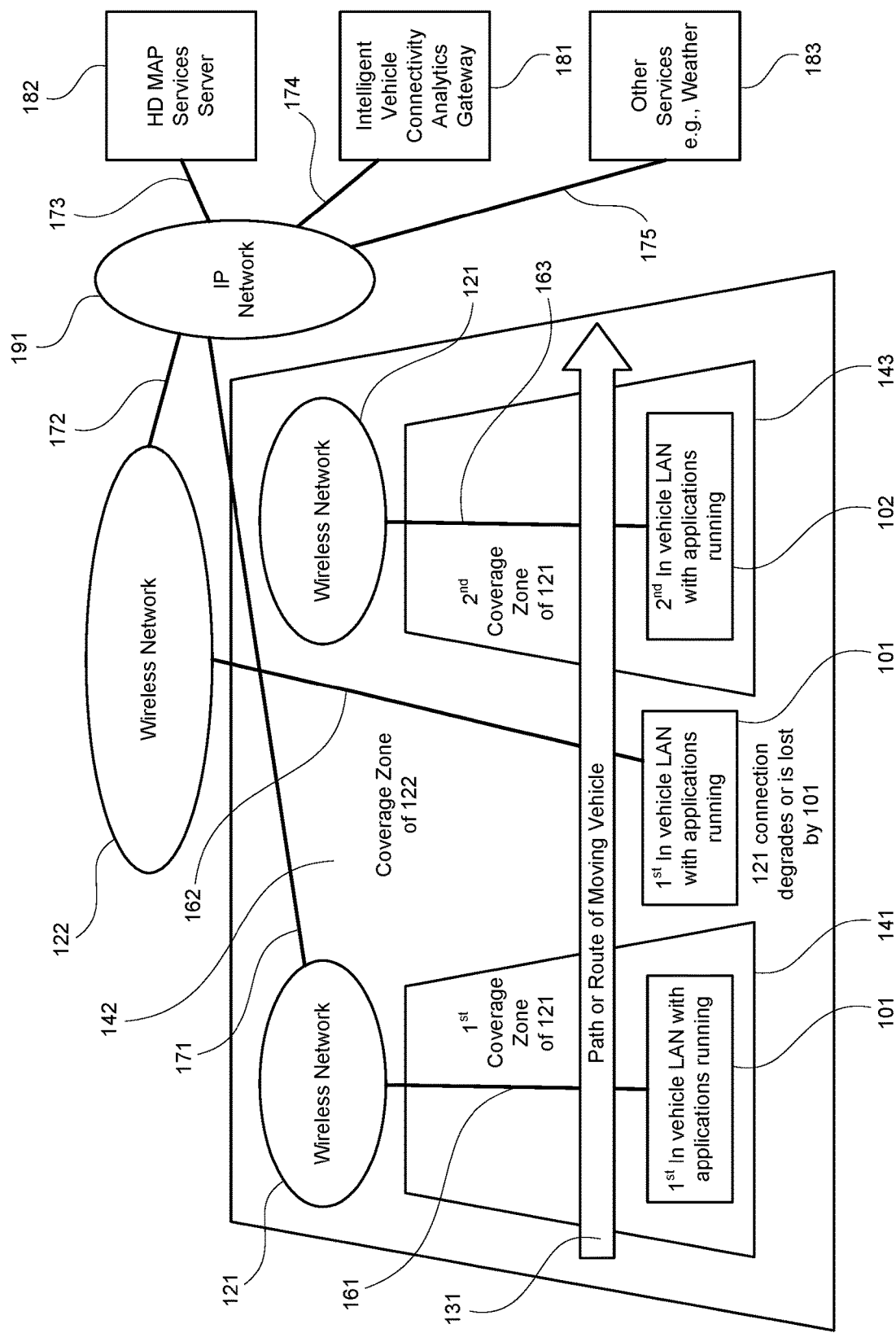
FIG. 1A illustrates an example of a network connectivity environment that can include wired and/or wireless devices that a moving vehicle is likely to encounter, with varying degrees of connectivity or no connectivity.
Figure 1B:
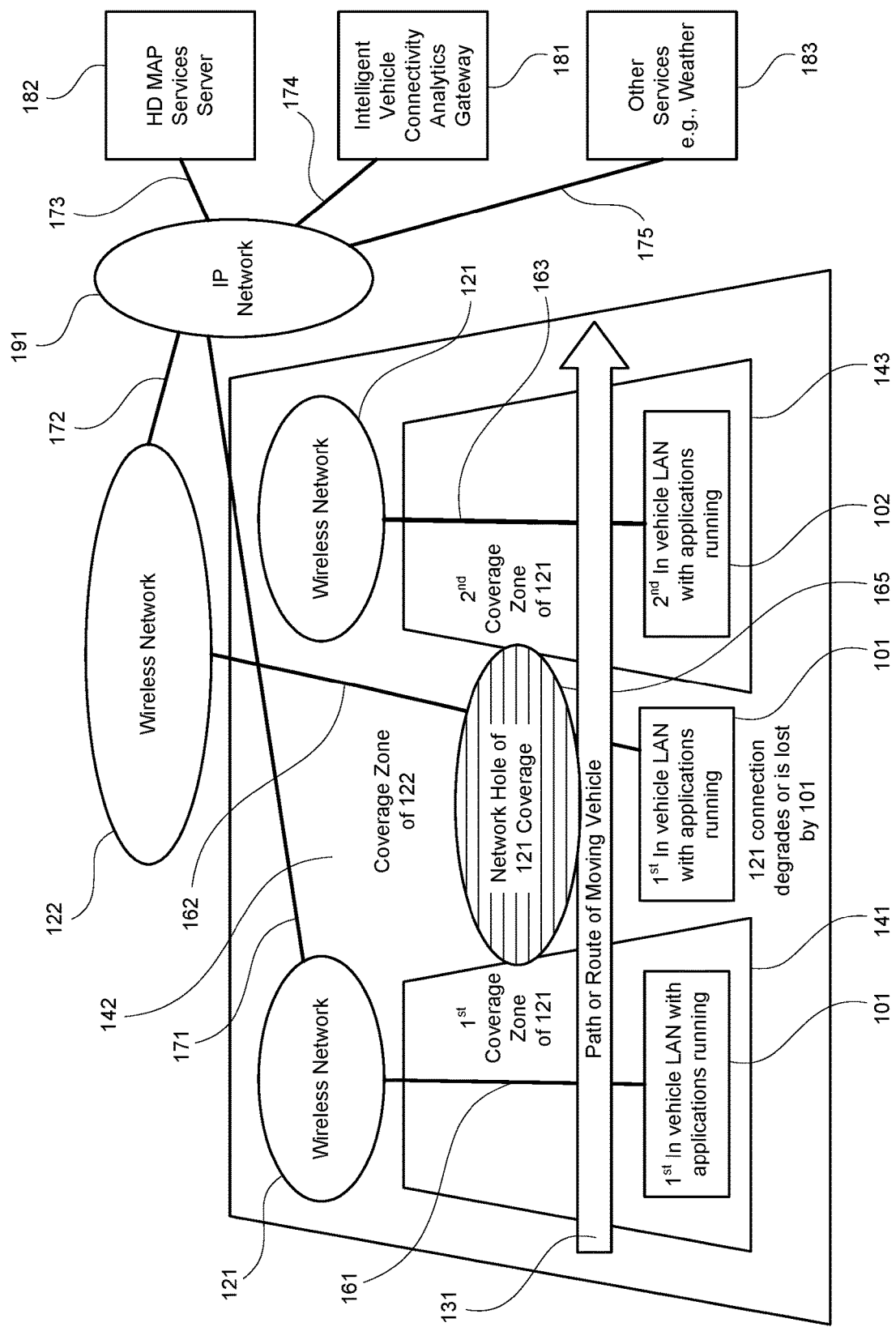
FIG. 1B conceptually illustrates an example of how network holes can appear as a vehicle moves, and how various servers and services can aid in their timely detection.

Examples of such wireless network access links 161, 162 and 163 (or access clouds or access paths) are illustrated in FIGS. 1A and 1B as two moving vehicles 101 and 102 travel from one location to another on a route 131.

Some of the driving factors for increasing computation capability in vehicles are: safety, emergency calling via voice and data messages, high definition maps for navigation, infotainment and mobile office, improving fuel efficiency, Advanced Driver Assist System (ADAS), Over The Air (OTA) software updates, Firmware Over the Air (FOTA) updates for Electronic Control Units (ECUs), and/or On Board Diagnostics (OBD), etc. These applications, which increasingly require a network connection, place a set of stringent requirements on the availability and quality of network services, in particular wireless network services. At times when vehicles are parked and not moving, they may require a mix of wired and wireless network services. In this context, a number of problems regarding the nature of connectivity exist that need to be overcome or mitigated. Several of these problems are described below.

1.1 Single Homing for Vehicles

The majority of vehicles today depend on a single communications provider, which could be a cellular phone service provider (e.g., for cars) or a satellite service provider, e.g., for marine-based vehicles, such as ships, and some cars. Typically, the availability of these network services with adequate performance for today's in-vehicle computing applications is seldom better than 99.9%, which translates into more than 8 hours of downtime per year. This could mean on average four outages of two hours each per year, or eight outages of 1 hour each, per-year. In the context of a road trip that might last 30 minutes on average, this poses a serious risk that an outage happens at a critical time, such as an accident or emergency. In fixed enterprise computer local area networks (LANs) connected to the Internet, the need for redundant network links and Internet multi-homing has become widely understood. However, in the case of in-vehicle LANs while the vehicle is on the move, this problem of redundancy and multi homed connectivity has not been adequately addressed and solved.

1.2 Traditional Routing Approaches can Break Applications

Even when multi homed wide area network (WAN) solutions have been deployed, there are other problems. When two or more networks are present, each from independent service providers, another problem poses itself. In such a case, the two or more wireless based networks are run by autonomous entities, and are referred to in the network literature as Autonomous Systems (AS-es). When a failure in a specific network path (e.g., provider path) to a specific destination occurs in a first AS network, application traffic for that specific destination needs to be re-routed automatically via a second AS network. The time between fault detection on the first AS network, and a successful re-route to the second AS network, is called the routing convergence time. In some AS routing protocols, e.g., the Border Gateway Protocol (BGP), that convergence time is often 5 minutes or longer. During this period of convergence, unfortunately, many applications—including voice conversations and web applications—break. For example, with voice applications such as telephone calls, the speakers may hang up the call because there is silence and no audio signal coming in, after several seconds of silence, simply because the speaker does not want to spend more time listening to silence or waiting for a resumption of the voice session. Further, as in many network devices that track the presence of speech traffic and detect periods of silence, there are timers that automatically terminate the voice session if a period of silence lasts longer than, for example, about 20 or 30 seconds. In light of these examples, the 5 or 10 minute convergence time for traditional routing protocols is a serious problem, as it breaks application continuity.

1.3 Traditional Routing Protocol Solutions are Often Impractical for Small Networks While BGP and similar solutions have been used in large enterprise networks, they are often impractical in smaller networks. Some of the difficulties involved are: (1) the need to obtain an AS number unique in the worldwide routing system, which is a cumbersome exercise for small users; (2) the need to have highly paid and competent staff to administer the BGP router configuration, as this task is complicated and requires expert knowledge in order to coordinate routing and frequent collaborative troubleshooting with peering service providers' technical experts; (3) the monetary costs of complex router purchase and implementation. These factors prevent conventional routing solutions from scaling to support thousands or millions of small networks, as in home networks, let alone in-vehicle networks which are embedded and transparent to the vehicle operator.

1.4 Applications Break in Network Address Translation (NAT) Based Multi-Homed Routing As described in U.S. Pat. No. 7,620,037 ("the '037 patent")—which is incorporated by reference in its entirety, multi-homed network routing appliances can be built that avoid some of the scaling problems posed by BGP and similar traditional Inter AS routing protocols. These are sometimes marketed as "dual WAN firewalls" or "dual WAN" routers. They partially solve the scaling problems by being standalone and avoiding routing protocol peering and coordination with adjacent network service providers, and by using Network Address Translation (NAT) where the source address on outbound traffic is modified, or the destination address on inbound packets, is modified, in an appropriate way. Practitioners of ordinary skill in the art are familiar with such dual or multi homed NAT routing techniques.

It is also well known that in packet network traffic which encounters NAT routers, firewalls and similar devices, existing sessions can break. Existing sessions which embed IP addresses inside transport protocol headers and inside the application layer section of packets, or which maintain complex state-based on IP addresses, can and do break when these IP addresses suddenly change as a result of some routing decision by a device or by sender or receiver. For example, all existing TCP sessions—which are a function of each endpoint's IP address and port number, a total of 4 parameters—do break if a packet shows up and the IP address does not match in the session table typically called the Transmission Control Block (TCB); when such an event occurs, end systems behaving according to the TCP standard send a TCP reset packet to the source, which requires the TCP session, and therefore associated application, to terminate abruptly.

In making NAT based routing decisions for reasons of network failure or degrade, the detection mechanism for such conditions must be highly reliable, otherwise there will be a serious 'false positive' problem with sessions breaking needlessly.

"Application continuity" and "no disruption of calls or sessions" and "session persistence" are all inter-changeable terms in the background of the invention.

Given that NAT routers which are multiple homed frequently break existing sessions when performing a re-route, the problem of a lack of application continuity is a serious one for connected vehicles, as NAT will be expected to play a major role in providing connectivity to moving vehicles.

1.5 Holes in Geographic Coverage by a Network Service

A very difficult and new problem in mobile in-vehicle LANs is the lack of ubiquitous geographic coverage by any single network service. Typically, single network services—such as LTE operators, and satellite operators etc., are run as independent routing domains, i.e. they are separate Autonomous Systems (ASes) with separate IP address blocks assigned to them for purposes of global routing.

Each individual wireless network service is unable to provide high performance coverage everywhere today, for a variety of reasons including network congestion that varies in time and place. These result in "network holes" in the geographic coverage map of a service provider, something which every mobile phone user experiences when a call disconnects or is unable to complete when traveling down various roads, or while at sea. As used herein, a network hole can refer one or more geographic regions in which network service connectivity for one or more providers is significantly degraded and/or unavailable. Real time, as opposed to static, network degradations can be measured using virtually any network connectivity parameter, including but not limited to one or more of: packet loss rate in each direction, available bit rate in each direction, jitter in each direction, round trip time (RTT), one way latency, out-of-sequence packet conditions, wireless signal strength, and others, without limitation.

With LTE and 4G/5G networks, two major problems are: (1) the high cost of operating cell towers and base stations to provide universal coverage; and (2) the high cost of backhaul networks to connect each cell site to the core network of the mobile operator. In the case of the latter, they are needed in proportionately larger quantities as the traffic in each cell site grows, and they are costly. Due to these economic factors, the end result is poor or no coverage in many areas, including urban areas which can be so badly congested that each user's bit rate allocation is reduced.

In satellite networks, rain and moisture in the air can severely attenuate signals, especially in the higher frequency Ka bands used for high throughput satellite services. Lower frequency bands, such as the Ku band, are less impacted by rain and moisture.

Many wireless networks (e.g., microwave networks) also require a line of sight between transmitter and receiver. Line of sight problems can arise due to tunnels, trees, tall buildings, etc. These also result in holes in network coverage.

A network hole by itself is not a binary concept—aside from no signal or 100% signal strength, there are a whole range of potential network path problems that can cause packet loss over wireless communications. The concept of a network hole is therefore multi-layered—each network performance metric such as packet loss rate, available bit rate, jitter, RTT latency—if it crosses certain well known thresholds—can have adverse bearing on specific applications.

Such data—whether static data or live data in real time—on network holes and their composite nature are today not widely disseminated by wireless service providers to their users, assuming they have the data in the first place. It is fair to say it is not easy to collect and update such information easily on a country wide or world wide scale.

1.6. Plain Load Balancing is Insufficient

Some WAN routers perform load balancing of traffic in static ways e.g. per-packet or per-flow, for example, using a round-robin placement among a set of 2 or more alternate paths. In the context of moving vehicles and the presence of network holes, this approach does not work anymore, primarily because user sessions can break immediately when a NAT is involved, and many in-vehicle embedded applications do not have an option for manual restart, unlike human interactive applications. A much more cognitive and intelligent approach is needed than the traditional NAT router approach.

DESCRIPTION OF THE INVENTION

Aspects of the disclosed technology address the foregoing problems of vehicle connectivity by providing methods and systems for ensuring vehicle network connectivity, for example, by providing systems and methods for performing application flow placement that anticipates potential location-specific points of network degradation in a geographic coverage map (network holes). In some aspects, the disclosed technology provides systems and methods for identifying network holes along a specific vehicle path, and for intelligently routing traffic flows over available (alternative) provider paths to avoid network connectivity disruptions, i.e., to avoid network holes. Additionally, the disclosed technology provides for predictive flow switching, for example, by calculating upcoming network holes on a vehicle path and for intelligently predicating provider path availability for current and future network flows along the vehicle path.

As used herein, network holes can refer to a loss or degradation of network connectivity in at a particular geographic point or over a geographic area. In some instances, network holes may refer to a lack of coverage (or degraded coverage), with respect to a particular network provider path (e.g., with respect to a particular ISP).

FIG. 1A illustrates an example of a network connectivity environment that can include wired and/or wireless devices that a moving vehicle is likely to encounter, with varying degrees of connectivity or no connectivity. Specifically, FIG. 1A shows two moving vehicles 101 and 102 in a large zone covered by two wireless network service providers 121 and 122. The areas where networks 121 and 122 have adequate wireless signal coverage areas are shown as 141 and 143, respectively. By way of example, network 121 could be a cellular LTE provider and 122 could be a low earth orbit (LEO) satellite service provider. However, it is understood that network 121 can represent any type of data network that is maintained or administered by any network provider. The various services shown in FIG. 1A include an Intelligent Vehicle Connectivity Analytics (IVCA) gateway 181, a high definition map server 182 and a weather services server 183. It is understood that the environment of FIG. 1 could include additional (or fewer) service providers of similar (or different) type, without departing from the scope of the disclosed technology.

FIG. 1B conceptually illustrates an example of how network holes can appear as a vehicle moves, and how various servers and services can aid in their timely detection. Specifically, FIG. 1B illustrates how, using the methods to be described here, the moving vehicle 101 can automatically detect a localized network hole 165, specific to a particular network provider, e.g., wireless provider 121.

Figure 2:
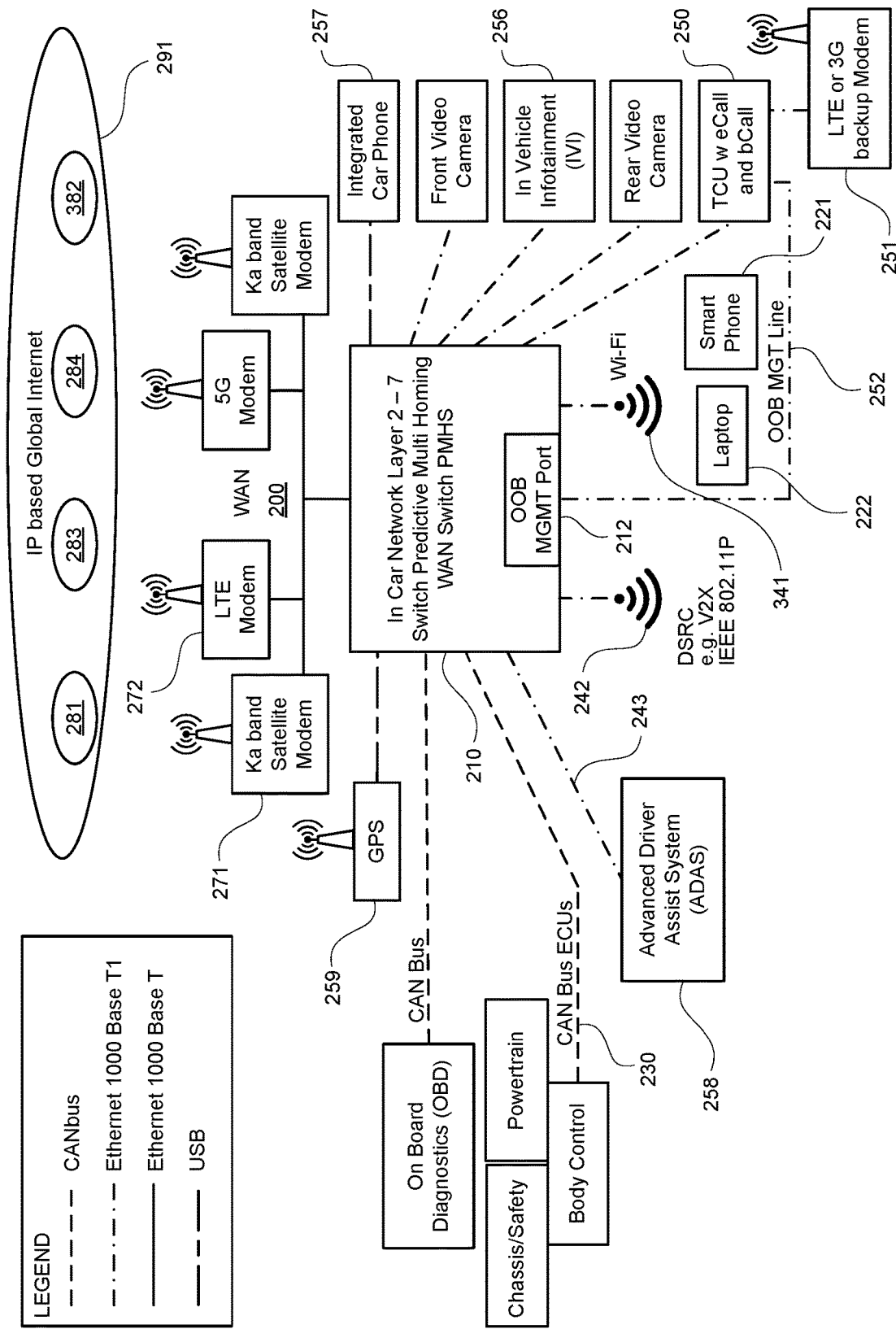
FIG. 2 illustrates an example of a Predictive Multi Homing Switch and how it can be operatively implemented inside existing in-vehicle local area networks (LANs) and configured to provide continuous application connectivity to a computer network, such as the Internet.

FIG. 2 illustrates an example of a Predictive Multi Homing Switch and how it can be operatively implemented inside existing in-vehicle local area networks (LANs) and configured to provide continuous application connectivity to a computer network, such as the Internet. Specifically, FIG. 2 shows an example of the key embedded system inside the moving vehicles 101 and 102, the Layer 2-7 Predictive Multi Homed WAN Switch (PMHS) 210. This illustrates one possible embodiment of the invention.

In one aspect, PMHS 31 connects the various LAN segments comprising the various in vehicle LANs—which may be both wired LANs and WLANs such as 241, 242 and 243—to the larger WAN 200, example connections as in FIG. 2. The PMHS 210 performs observed measurements of natural traffic between individual vehicle Electronic Control Units (ECUs), Telematic Control Units (TCUs), infotainment units and other devices and external WAN located devices. The PMHS 210 also performs self-initiated connectivity measurements, the active "probes" described in the '037 patent, of each ISP access cloud e.g. access clouds 281, 282, 283 and 284, in conjunction and with co-operating measurement software running on an Intelligent Vehicle Connectivity Analytics (IVCA) Gateway 181, which is a measurement server with sufficient computing power to continuously take diverse connectivity measurements of large numbers of moving vehicles concurrently.

In addition to being LAN connectivity options for PMHS 210, the networks such as DSRC 242 and WiFi LAN 241 can also be implemented as WAN pathways, in which case they can function as alternate WAN paths to LTE path 283 or satellite path 281.

The measurement server or IVCA gateway 181 can be physically located virtually anywhere. In some aspects, IVCA gateway 181 is external to the vehicle and connected to the vehicle via the WAN. The types of measurements received and administered by the IVCA gateway can include but are not limited to: bit rate throughput, packet loss rate, latency, round trip time (RTT), jitter, out-of-sequence events—in each direction of traffic, and for each possible access cloud path that a vehicle may connect to. Without limitation, examples of such access cloud paths include WiFi, DSRC, LTE, 5G, Ethernet, and/or other types of network building blocks.

A geographical connectivity database is computed, by receiving network inputs from vehicles that have traversed the local region. Network measurement data can be recorded for specific periods of time, such as in the near or distant past, and/or may be combined or aggregated with recent measurement data for the same region, and/or for an adjacent geographic region, such as LANs in mobile vehicles 101 and 102 in FIG. 1A.

These inputs can include one or more of: (1) Global Positioning System (GPS) or equivalent geographic location coordinates of the place the measurement was taken, (2) time stamp information as to when the measurement was taken, (3) weather data obtained from sensors or from data feeds provided by cloud based services—in addition to connectivity measurement data collected using the distributed measurement algorithms computed by PMHS 210 and IVCA gateway 181.

Using all or a portion of the collected measurement data—GPS, WAN service provider path, weather, connectivity metrics—a composite, multi-layered geographic database, with associated map of connectivity is computed. Updates to the geo-connectivity map can be performed periodically or continually, for example, as new or updated measurement data is received in real time. The collected contributions of data from multiple vehicles in the same region around the same time causes this geographical connectivity data set to become very large over a relatively short time, enabling highly accurate and statistically significant inferences to be derived, regarding a number of metrics, which include without limitation, data on application traffic flows, micro-flows and their expected durations.

By combining the speed and route (as in the path or route 131 of FIG. 1A and FIG. 1B) of the vehicle with the geographic connectivity map data, it is possible for the PMHS 210, working independently in many cases, or in conjunction with the IVCA Gateway 181 in other cases, to predict various connectivity events that would be adverse to the smooth performance of applications, and then to perform predictive application flow placement by choosing the best available path from a set of redundant paths, before the vehicle encounters any network holes. By performing such flow placement predictively—application continuity is maximized, and can be 100% if redundant wireless paths are always available while the vehicle is moving.

The IVCA gateway 181 could be connected in one embodiment of the invention at a data center with a path 174 to the public network 191, one instance of which could be the global Internet.

Application Continuity

We describe here methods to detect or predict network degrades reliably, and auto correct computer application traffic flows by placement on alternate ISP paths, in a number of milliseconds, or less, in a time interval small enough that human beings, given slow reaction time which ranges from 170 milliseconds to 250 milliseconds for different stimuli, do not notice that something adverse happened with the computer application flow. By 'computer application flow' we include not just user computing devices such as laptops and smart phones, but also embedded in-car computers, such as ADAS, TCUs and so on. Application flows can include any network traffic that is performed by, or on behalf, of an application or other software routine. Application flows can include data for, voice, video or other media types.

Fast Detection

The first step is the fast and reliable detection of network related problems. Discussion of network-related problems is described in U.S. Pat. No. 7,620,037, entitled, "Reliable ISP access cloud state detection method and apparatus" which is incorporated by reference in its entirety. An example of a Multi-Homing System integrated with an Adaptive ISP Access Cloud State Detection apparatus (ACSD) is described here. Techniques to reliably detect the failure of an ISP Access Cloud—which could be an LTE or 5G service provider, or a Satellite Internet service provider—very quickly in typically milliseconds, are described here.

For example, and without limitation, if the maximum of the most recent 30 samples of observed round trip times, out of a large data set of hundreds or thousands of observed round trip times, is T, then a small integer multiple k multiplied by T, i.e. kT becomes the time duration that it takes to detect a failure of a cloud with very high probability. The mathematical proof behind this statistical approach is described in the '037 patent. The value k can be as small as 3 or 4. If T=5 milliseconds, then reliable failure detect can be performed in as little as 15 milliseconds. If T=20 microseconds, the failure can be detected in 60 microseconds.

Both the Predictive Multi Homing Switch PMHS 210 and the measurement server or Intelligent Vehicle Connectivity Analytics (IVCA) Gateway 181 collect large data sets; the IVCA 181 in addition collects all the data from multiple vehicles' PMHS measurements, and also derives various aggregate statistics and analytical conclusions—related to geographical location and other data such as weather, loss of line of sight, etc.—that can be computed in the background.

PMHS 210 is designed to be installed in-line with actual traffic, and so reasonably large data set collection is possible in the local PMHS. This allows faster inferences in many cases, such as in Voice Over IP (VOIP), as disclosed in U.S. Pat. No. 8,009,554 (the '554 patent) entitled "Method for Multiple Link Quality of Service for Voice and Video Over Internet Protocol," which is incorporated by reference in its entirety. In most cases an RTP packet in an individual stream will arrive once every 20 milliseconds, therefore non-arrival of any RTP packet in that stream for a period of 3×20=60 milliseconds could be a reliable indicator that the session is about to break, well within the known human reaction time of 170 milliseconds for an audio stimulus.

More generally, the same statistical methods detailed in the '037, patent can be applied to allow the PMHS 210, or the IVCA gateway working through the PMHS 210, to reliably detect the failure of various components connected to the in-vehicle LAN, e.g. the TCU or the ADAS, or the individual LAN components, within micro-seconds (in the case of 100 Base T1 Ethernet used as an in car or in vehicle backbone LAN) or nano-seconds (in the case of 1000 Base T1 Ethernet used as an in car or in vehicle backbone LAN) instead of milliseconds.

Auto Correction

The second step after reliable detection of a degradation in network connectivity is to perform automatic correction. Some of these procedures are described in the '554 patent, such as, techniques to move SIP and RTP based voice and video stream transmissions between independent network paths, without breaking the stream transmission, in the presence of NAT operations occurring, is described here in detail.

Auto correction is done by computed placement of the application flows on a network path with better performance metrics, as measured and computed. In FIG. 2 there are 4 alternative network paths to choose from specifically 281, 282, 283 or 284. The computed placement can be current— as when a real time break event is detected and an urgent corrective action is needed—or it can be anticipatory and predicted, as described further below.

PMHS and Predictive Flow Placement

For purposes of this document, the PMHS apparatus described here is implements the hardware features of the ACSD apparatus of the '037 patent, but goes on to add several more that are critical to moving vehicles and predictive flow switching. Two of these features, without limitation, are: (a) a silicon chip for getting precise geographic positioning data, e.g. GPS, GNSS or equivalent chip 259 in FIG. 2, (b) digital computing techniques to measure or read the speed of a moving vehicle, for example by sending CANbus commands to an in vehicle tachometer, as shown via 230 in FIG. 2, and its direction relative to its current position in a geographic map.

FIG. 2 depicts in vehicle LANs, and how the PMHS 210 connects these to the WAN 200 via multiple WAN paths, via cellular or satellite modems 271, 272, etc., which network packets are transmitted and received on. Each vehicle has an in-vehicle Local Area Network (LAN), or multiple such LANs, which could be of various types (802.11 WLAN, 802.3 Ethernet, CanBus, and residing on these LANs are one or more computing devices (see FIG. 1B) each running various networked applications, each of which may be connected to the wider IP network 291, one embodiment of which could be the public Internet, without limitation.

The WAN paths i.e. network service provider (NSP) paths 281, 283, and 284 can—and without limitation—belong to independent Autonomous Systems, a concept in inter domain routing well known to practitioners of ordinary skill in the art. Each of these domains have non-overlapping IP address spaces, where these IP addresses are either (1) public and globally reachable, (2) using a private IP address space, or (3) using IP address blocks used for ad-hoc networks. In the PMHS making a flow placement decision, and when NAT or PNAT is used as is typically the case, the source IP address in every packet must be modified to a different source IP address belonging to the separate IP address block assigned to the new NSP.

The computing devices could be various types of Electronic Control Units (ECUs) such as the CANbus ECUs 230 in FIG. 2 It could also be a TCU telematics control unit 250 or an infotainment computer (e.g. smart phone 221, laptop 222, video player, or the like), more generally known as an IVI unit 256, or an Advanced Driver Assist System 258 (ADAS) dependent on receiving updates to a High Definition (HD) map in near real time from navigation data service providers connected to the WAN cloud.

The Telecommunication Control Unit TCU 250 is used for emergency calling (eCall) or breakdown calling (bCall). The predictive flow switching techniques described here provide continuity for voice calls originating or being received by the TCU 250, as all the redundant pathways 281, 282, 283 and 284 to the public Internet 191 are made available to it and controlled by the PMHS 210.

An integrated car phone 257 via USB tethering, or via Ethernet bus, is also depicted in this embodiment. An embodiment of the USB car phone could be in the form of a mechanical smart phone car holder with a built in USB port which is used as a WAN option for the tethered smartphone, and with WAN routing service for phone 257 being provided by the PMHS 210 with its diverse WAN paths 281, 382, 283 and 284.

As mentioned, the PMHS 210 resides in-line with all network traffic, which means all packets flow through it or are visible to it, and PMHS 210 observes and stores all flow data in various tables, such as flow tables and RTT tables disclosed in the '037 patent. These methods of flow collection and classification are similar to methods used in sFlow and Netflow, as described in the '037 and '554 patents, and methods of table creation, insertion and lookup are well known to practitioners of ordinary skill in the art. Every single application flow and micro-flow that is observed by PMHS 210 as being set up, will find an entry in the PMHS flow table, as soon as the first packet of the flow or micro flow is observed.

By engineering a choice of at least 2 wireless provider paths, e.g. the LTE path 283 and the satellite path 382, via its connection to the PMHS 210, and the reliability of the PMHS 210 can be improved from the 99.9% up time published for each network, to 99.9999% up time for most applications, as both network paths are rarely likely to fail at the same time. This reduces the expected down time per year from 8 hours to only about 31 seconds.

In-band remote management of the PMHS 210 e.g. via SSH or other protocol, that is suitably secure, can be done over any of the public Internet 291 accessible WAN paths 281, 282, 283 and 284. The PMHS algorithms provide for non-stop continuity of the in-band remote management application, in the same way as for all other applications as described in this invention.

In addition, an Out-of-Band (OOB) management port 212 is also provided on the PMHS 210, connected by an Out-of-Band (OOB) network path—which could be Ethernet or CANbus or USB without limitation—to the car manufacturer provided TCU, which has a low cost 3G or lower category LTE modem 251 connected to it. The OOB management port is useful if for some reason the PMHS has a software fault and in such cases it can be designed to exit gracefully into a ROM monitor program which can only communicate with the OOB port, which is restricted now to only modem 251 as a WAN option. The OOB port can be connected to the TCO optionally via an Ethernet link 252.

Flow table records include all relevant protocol information at the data link, network, transport, session, presentation and application layers. In addition they include current path selection information, and entries to assist in NAT (network address translation) and PAT (port address translation) flow placement and appropriate packet header modifications, whenever a decision is made by the PMHS to switch paths.

Application Sensitivity to Network Conditions a Decision Factor in Flow Placement Application sensitivity thresholds are stored in a table or data base on both the PMHS 210 and the IVCA 181. These sensitivity thresholds are well known to practitioners of ordinary skill in the art, and constitute static knowledge that can be used in network device decision making. An example of such information, without limitation, and a corresponding table are shown below.

TABLE 1

Application Sensitivity Thresholds
to Network Metrics by Flow Type

| | Packet Loss Rate | RTT latency | Jitter | Throughgput/ Available Bit Rate |
|---|---|---|---|---|
| Voice | >1% | >250 ms | >40 ms | <32 kbps |
| Email | >3% | No effect | No effect | 200 kbps |

In this table, the rows are applications or application flows, without limitation, and the columns are various types of network measurement thresholds, which if crossed will result in significant degrade or complete failure of the corresponding application flow.

Only a subset of possible entries are shown above in the table, to illustrate the principle, and without limitation. These kinds of threshold values are commonly used in network engineering when experts perform tasks manually, although the exact values used can vary within reason.

This table is used to predict geographic regions where adverse conditions are likely to be encountered, as a vehicle moves, as it may from time-to-time, encounter a 'network hole' in various forms.

To illustrate, consider the voice application and jitter. If multiple vehicles' PMHS units perform the distributed jitter measurements—see 388 and 389 in FIG. 3—in conjunction with IVCA Gateway 301, and if, for example and without limitation, the average or 80 percentile value is greater than 40 milliseconds for a specific ISP and a specific geographic location, the IVCA alone can (a) map out the extent of this network hole for jitter (b) communicate it in advance to the PMHS inside moving vehicles, after which (c) the PMHS can make a decision whether or not to predictively move a flow.

Figure 3:
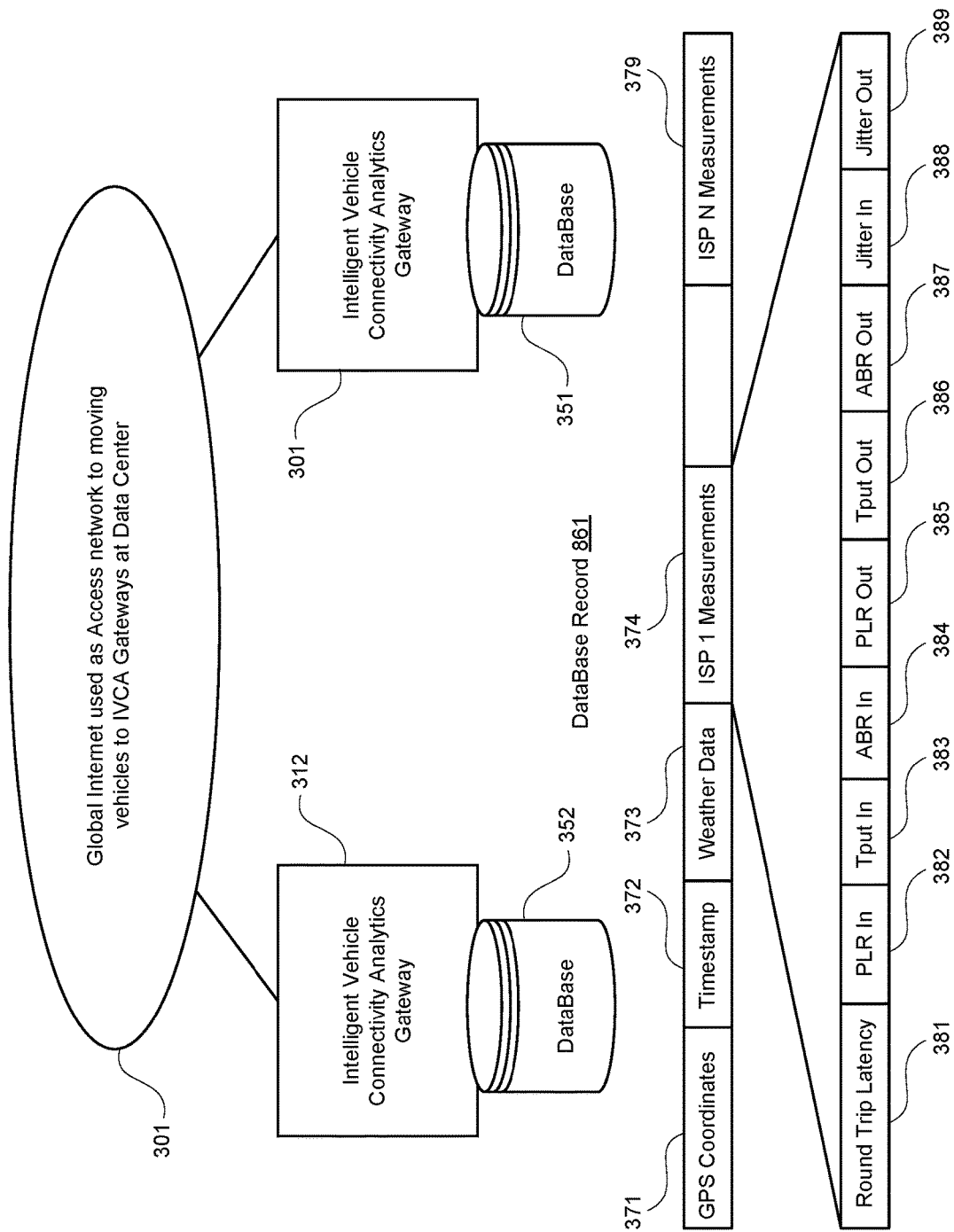
FIG. 3 depicts an example of how network measurements can be crowd sourced and used to facilitate the creation of a geo-connectivity map, according to some aspects of the technology.

FIG. 3 shows how a replicated data center based geo-connectivity database or geo-connectivity map (351 and 352) for each moving vehicle 101 or 102 is constructed, in co-operation with replicated IVCA gateways 301 and 312), these IVCA gateways being connected to the public Internet 301. The IVCA gateways store sets of crowd-sourced global geo-connectivity data, such as obtained from moving vehicles 101 and 102. As described below, PMHS systems in all moving vehicles (e.g., 101 and 102) can perform measurements cooperatively with the IVCA gateways 301 and 312.

The terms geo-connectivity database and geo-connectivity map are for the purposes of this document inter-changeable. The geo-connectivity map is a visual representation of the geo-connectivity database, which is a kind of geographic information database.

FIG. 3 further shows the nature of a local database record 361 which could have been reported by vehicle 101, and this record can include location e.g. GPS coordinates 371, timestamp 372, local weather data 373, and an associated set of localized, instantaneous measurements for ISP 1 as 374 and for ISP N as 379, where ISPs 1, . . . , N are the wireless or other network service providers encountered by moving vehicle 101 at a specific location and instant in time.

FIG. 3 also shows without limitation, examples of network measurements at the instant and place for vehicle 101, such as latency 381, packet loss rate (PLR) inbound 382, throughput in bound 383, available bit rate (ABR) inbound 384, PLR outbound 385, throughput outbound 386, ABR outbound 387, jitter inbound 388 and jitter outbound 389.

Network Holes and Geo-Connectivity Maps:

As discussed above, the need to collect and store in a database geographic information which impacts connectivity was described. These transient phenomena encountered by a moving vehicle are what we refer to as network holes. Examples of such are line-of-sight issues where a network signal can become impaired, local rain, fog and weather conditions, location and extent of road tunnels, tall buildings, and other kinds of physical infrastructure without limitation.

A geographic database, similar to geographic databases implemented for road navigation or maritime navigation, is implemented here as part of the invention described here to capture the exact time and location of transient or permanent network holes.

However, unlike the geographic databases implemented by Google, Apple and all the cellular service companies like ATT and Verizon, this database has raw data on network metrics experienced from the perspective of the moving vehicle, including (a) GPS or other equivalent coordinates e.g. GNSS, etc. without limitation (b) time stamp for date and time to millisecond granularity (c) set of detailed and bi-directional network metrics at the instant in time for each of multiple wireless network service access clouds, including bit rates, latencies, loss rates etc., without limitation. Since cellular providers, if and when they do perform such measurements, do not share this data with the public or with their competitors, such measurement data as collected by the PMHS 210 and the IVCA Gateway 181 enables comparison of metrics across all available service providers at each instant of time.

We will call this record of transient or permanent network holes a Geo-Connectivity Database. The PMHS and the IVCA computing elements will each implement a Geo Connectivity Database, which will include GPS (or equivalent) coordinates as part of the data.

Multiple vehicles e.g. 101 and 102 in FIG. 1A are moving in a path 101 e.g. a road or a maritime or flight path, without limitation. The path of the moving vehicle could have wireless or other network service coverage as shown by networks 121 and 122. For example, network 121 could be a cellular based LTE provider network, with coverage areas 141 and 143, and 122 could be a broadband satellite service provider with coverage area 142. Other network types could be 4G, 5G, LoraWAN, IEEE 802.11 WLAN, IEEE 802.11 P, and without limitation.

The wireless networks 121 and 122 have connectivity via some backhaul network operated by a city or a commercial service provider via links 171 and 172, to a public network 191, to which all vehicles can possibly connect, either as a paid or as a free-of-charge service.

Bad weather in the form of fog or rain can also result in network holes, and another aspect of the invention is the ability to incorporate current weather conditions on a route of a moving vehicle 101 or 102 via a weather data server 183 connected by a link 175 to the public network 191.

Tunnels, tall buildings, and even trees can cause certain types of wireless networks (e.g. satellite, DSRC) to either deteriorate or lose signal altogether, and are another form of network hole that a moving vehicle requiring connectivity can encounter. High Definition map servers and services, such as server 182 in FIG. 1B, connected by link 173 to public network 191, can be used by a moving vehicle 101 to detect these kinds of network holes well in advance, in another embodiment of the invention.

FIG. 1B shows how a network hole 165 can appear in the distance ahead, while a vehicle is moving. Again, this hole is typically only associated with a specific network that some of the in-vehicle applications may be using. The example below illustrates.

Suppose a car with a PMHS 210 and actively communicating with its IVCA Gateway 181 is several miles away from a tunnel through a mountain, and there are several TCP/HTTP web applications already in progress, over a LEO satellite link. It is known by the IVCA Gateway—from the collective data sent by earlier cars which traversed the road earlier that LTE signals work well inside this tunnel. It is also known from earlier data that the LEO satellite signals are inadequate inside the tunnel and web TCP sessions will break later if nothing is done. In other words, the fact that a 'network hole' for TCP based web applications is about to appear, can be now detected and acted upon by the PMHS.

In order to better comprehend the definition of a geo-connectivity map, or geo-connectivity database, we can summarize, without limitation, the following properties:
  a. It describes network holes in various geographic locations on land, sea and air that will impact computer-networked application performance inside a moving vehicle in adverse ways
  b. Network holes can be either transient, as with a temporary packet loss or stream jitter situation, or adverse weather in an area like fog; or permanent, as in a deep road tunnel or tall trees blocking line-of-sight to a satellite
  c. In the case of transient network holes they require automated and real time network measurements from the perspective of a moving vehicle, as computed by the PMHS to discover them and communicate their presence, location and time-stamp
  d. A PMHS may communicate these network hole events to another PMHS in another moving vehicle, or to roadside infrastructure, or to an IVCA Gateway as described
  e. Network holes are not restricted to binary UP or DOWN events, but include the much larger category of degradations in measured metrics that impact different applications to different degrees based on application sensitivity thresholds which are well-known and are used as a part of active flow placement or migration. Examples of these include available bit rate, latency, jitter, and others, as elsewhere described in this specification, without limitation.

Tracking and Reporting Application Flow Life Times

Flows appear and disappear, e.g. a user fires up a Web page using a browser, and then leaves the page. The PMHS using its flow tables, computes and performs statistical analysis on flow life times—which can be optimized for a vehicle user's habits. As examples, the PMHS will have data such as: 100% of all HTTPS flows complete in 15 minutes, 95% of all HTTPS flows complete in 10 minutes, without limitation.

The PMHS is able to compute these flow lifetimes using standard network packet observation and timestamping techniques, which are widely known, and as taught in [5] and [11]. Without limitation, a possible segment of a flow lifetime table computed by a single MHS in a single vehicle is illustrated in Table 2 below, which is a table of application flow types organized in percentile categories for the flow lifetime. The large data sets from the crowd sourcing technique—whereby one or more moving vehicles (e.g., 101 and/or 102) contribute data sets—enable these percentiles to yield associated threshold times with a corresponding degree of statistical reliability. Example below: 95% of all email flows only live for 30 minutes, implies if a 5% degree of error in flow switching was allowed, that the threshold L shown in FIG. 4 can be 30 minutes. In the same example, if a 0% error rate was mandated this table shows that for email flows the value of L is raised to a longer, more conservative value of 80 minutes.

TABLE 2

| Flow types and Percentile Lifetimes | | | | |
|---|---|---|---|---|
| | 100% | 95% | 80% | 50% |
| Web/HTTP/HTTPS | 15 mins | 10 mins | 1 min | 10 secs |
| Email/POP/SMTP | 80 mins | 30 mins | 10 mins | 3 mins |

Predictive Flow Switching by Pro-Active Migration

The IVCA Gateway collects from all cars' PMHS 210 units messages on (1) flows (2) lifetimes as an array of values by percentile. This is done on a periodic basis, so that the IVCA has a statistically large data set of flow life times, across multiple vehicles and their users.

When a network hole appears that adversely impacts HTTPS flows on a specific WAN path e.g. 282 in FIG. 2, the task of the PMHS 210 is to migrate all new HTTPS flows early enough from the satellite path 282 to say the LTE path 283, so that when the car finally reaches the network hole, there will be no break of those HTTPS sessions.

By way of example, if the PMHS 210 is 15 minutes away from a network hole, and statistical data on HTTPS flows are up-to-date as the example in the table above, then 100% of all HTTPS flows which are current sessions will age out before the hole is reached by the vehicle. All new flows within 15 minutes before reaching the whole would have been placed by pro-active migration on to a service provider path that did not have a network hole.

IVCA Gateway and Measurements

Figure 4:
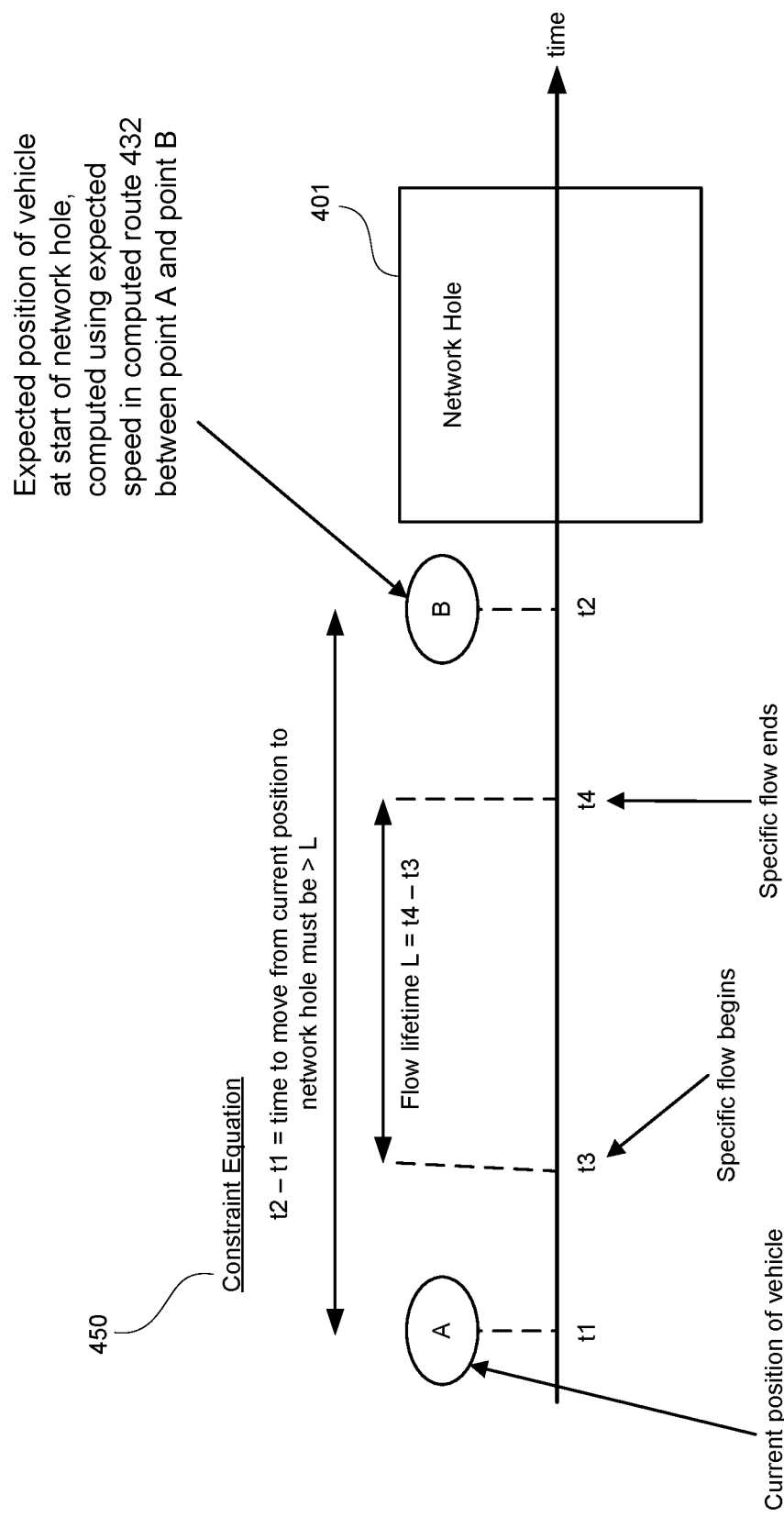
FIG. 4 conceptually illustrates an example of a predictive flow placement that is performed based on the anticipated approach of a network hole, according to some aspects of the technology.

The measurement server or IVCA gateway 181 is typically located external to the vehicle and connected via the WAN. These measurements are shown in FIG. 4 and are well known to practitioners of ordinary skill in the art. They include but are not limited to: throughput as in 383 and 386, packet loss rate as in 382 and 385, round trip time (RTT) as in 381, jitter as in 388 and 389, in each direction of traffic, and for each of the available access cloud paths shown in FIG. 2 e.g. 281, 282, 283, 284. Other measurements could include (a) whether the service causes packets to get out of sequence, and/or (b) whether the service is enforcing ingress source IP address filtering, etc.

Role of IVCA Gateway in Creating and Updating Connectivity Maps

Each vehicle's PMHS unit is associated with exactly one IVCA Gateway at initialization or install time, with redundant IVCA Gateways existing for fault tolerance, as is well known to practitioners or ordinary skill in the art.

It is important to distinguish between two kinds of network holes: static or permanent, and dynamic or transient. For example a Line of Sight hole due to a fixed mountain tunnel is static. An example of dynamic holes are those caused by changing weather, or by changing congestion conditions in a specific network. The attribute of dynamic or static is also stored in the Geo-Connectivity database.

FIG. 4 illustrates the basic method, without limitation, for predicting the latest time predictive flow switching should be performed in order to avoid session break caused by an approaching network hole along a route 432 that a vehicle is navigating on. The key role played by the constraint equation 450 (strictly an inequality) is explained below.

FIG. 4 also shows one embodiment of the invention where a constraint equation 450 based on the expected vehicle route 432, see FIG. 4, can be used to compute when the latest time can be to start moving application flows of a specific sensitivity type.

Predictive Flow Switching and Static Geo-Connectivity Map Data

Most vehicles are parked and stationary for large periods of time. During these periods, the IVCA Gateway will communicate with the PMHS and load or update the entire static connectivity map data, for a geographic region of reasonable size, into the PMHS. When the vehicle eventually begins a journey, and moves, it has all static data stored and is relatively self-reliant in making connectivity decisions for various application flows. As described in the '037 patent, the PMHS 210 can have a Control Engine that performs computations in the background—using GPS as in 1590 in FIG. 2, the GPS coordinates and the expected speed of the vehicle, it can compute the distance from the present location to the location of any network hole, such as hole 401 in FIG. 4, and the time expected to reach the network hole 401. Then, if any set of flows need to be migrated to a different network, the PMHS 210 has enough time to migrate application flows before the network hole is reached.

Predictive Flow Switching and Dynamic Geo-Connectivity Map Data

Dynamic connectivity metric changes can occur due to new Line of Sight Obstructions, or the removal of previous Line of Sight obstructions, the weather e.g. precipitation and moisture, or network related congestion which causes high levels of packet loss or jitter.

The IVCA Gateway updates each vehicle's PMHS with dynamic connectivity map changes at pre-configured or event-driven intervals. Only significant statistical changes detected by the IVCA Gateway 181 need to be communicated, with the gateway 181 computing a dynamic connectivity map update in the local region being approached, or expected to be approached, by the vehicle. In FIG. 4, the "local region being approached" is a superset in area of the expected route 432 and the network hole 165. The IVCA Gateway—by virtue of its large data set collected from many vehicles—and also by access to geographic databases provided by other services—can compute the dynamic connectivity map update using a simple procedure: (1) sort all known network holes by distance from the vehicle to be updated, and eliminate all the holes that are too far away i.e. so far away that all flows will age out by the time the vehicle reaches the specific hole, and the basic approach of constraint equation 450 in FIG. 4, along with estimates of maximum distances traversed for reasonable flow lifetimes L is used in such step of elimination (2) if there are holes remaining after elimination—the PMHS 210 forms the connectivity map update message as an update to a previous static connectivity map, and transmits the update message to the vehicle using one of the available network paths.

Avoiding Breakage of all TCP Sessions

In the specific case of any TCP session, this kind of predictive application placement for new TCP flows only—avoids having to break TCP sessions in mid-stream, which is what a sudden NAT reroute can cause if a TCP session is already in process and application layer data is flowing. The concept however is not limited to TCP sessions where simple observation of a TCP SYN 3-way handshake signals a new flow.

Put another way, new flow detection for TCP is based on detection of a SYN-SYN-ACK sequence. The SYN can be placed on a network that does not suffer from the network performance hole. This, without limitation, is an example of pro-active flow migration used to achieve predictive flow switching.

Avoiding Breakage of Non-TCP Sessions

More generally—whether it is UDP, TCP, IPSEC, GRE or other flows based on the "IP Protocol" field in the IP header, or "Next Header" field in case of IP version 6, there are early stages in session set up which the PMHS 210 observes, and for which a similar predictive placement decision can be made before the actual user session establishes. Examples of such triggers for new flow detection include, without limitation (a) a DNS request packet searching for the IP address of a specific named resource (b) a Transport Layer Security (TLS) Client Hello packet (c) a SIP/SDP packet.

Concurrent Application Flow Placement on Multiple WAN Paths

It is important to stress that the large data sets of connectivity measurements on both the PMHS acting standalone, and the PMHS acting in cooperation with an IVCA Gateway, enable not just intelligent placement when faults are about to occur. Every time a new flow appears, the PMHS has a full control on which WAN path to place it on, and traffic will end up being load balanced, with the best WAN path being chosen for each application flow. When both the LTE 283 and Satellite paths 282 are available, for example, latency sensitive voice traffic can be placed on 283 and throughput sensitive file download or video streaming can be placed on 282, so that all paths are in use concurrently, and in a way that maximizes the application performance.

Method for Predictive Flow Switching

One example of a process performed by PMHS 210 in illustrated in FIG. 2. To sum up what has been described, the steps and procedures implemented by the PMHS to accomplish predictive routing which minimizes the probability of sessions breaking or applications not experiencing continuity are shown in FIG. 5, and described here.

Figure 5:
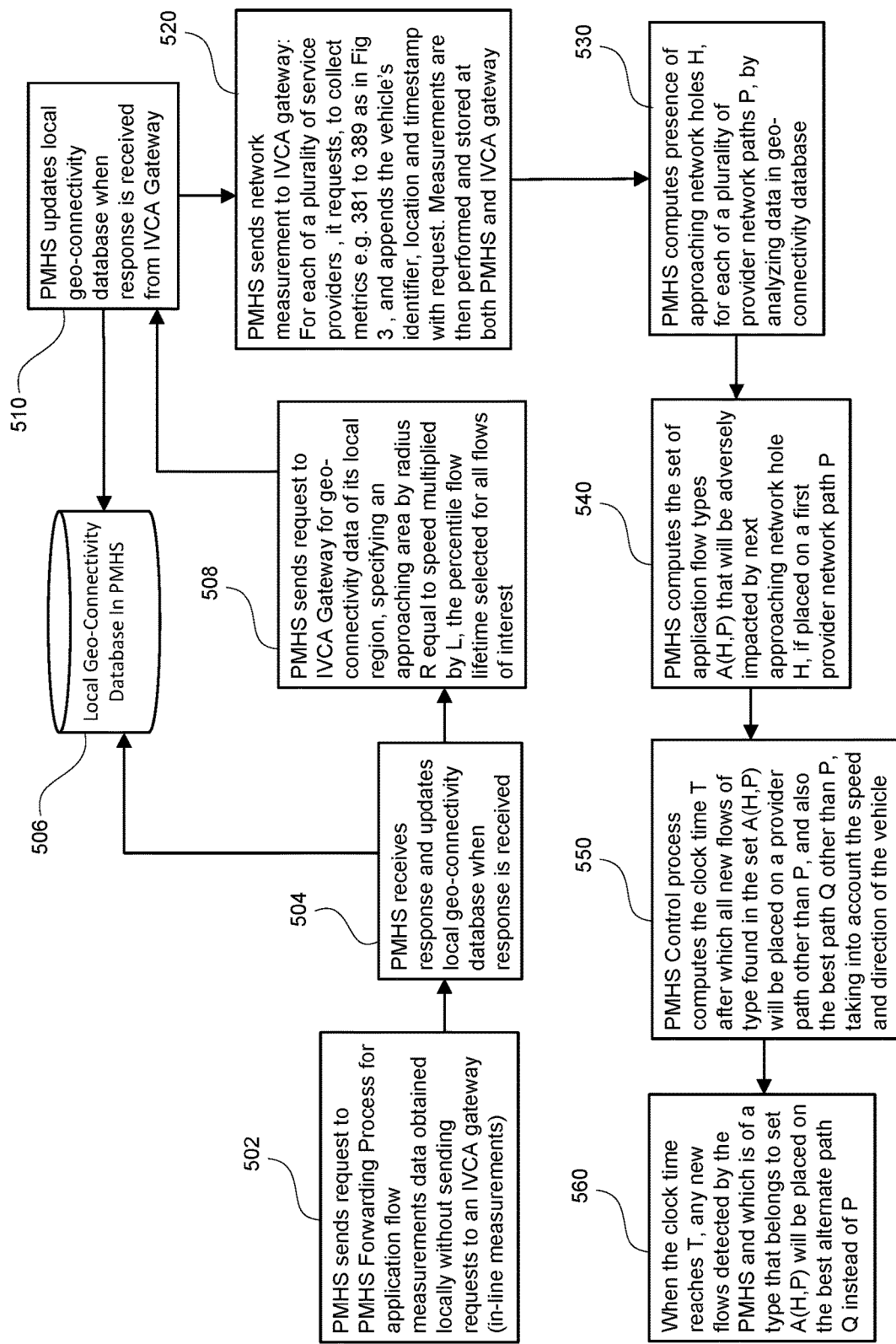
FIG. 5 illustrates an example process performed at least in part by a Predictive Multi-homed WAN Switch (PMHS) to compute and update a locally stored geo-connectivity database.

FIG. 5 illustrates an example process that includes 9 steps (i.e., 502, 504, 506, 508, 510, 520, 530, 540, 550 and 560), that can be performed by the PMHS, in one embodiment of the invention, to achieve local computation of the geo-connectivity database 506 and map in its immediate vicinity, or radius of interest, based on Table 2 and in-depth percentile based knowledge of flow lifetimes.

Without limitation, these steps are: (1) PMHS sends request 502 to PMHS Forwarding Process for application flow measurements data (local network measurement data) obtained locally without sending requests to an IVCA gateway (in-line measurements); (2) PMHS receives response 504 to the 502 request and updates a local geo-connectivity database 506, using the received measurement data, when response is received; (3) PMHS sends request 508 to a remotely located IVCA Gateway for geo-connectivity data of its local region, specifying an approaching area by radius R, which could be equal to speed multiplied by L, the percentile flow lifetime selected for all flows of interest, or some other formula embodying the idea of a radius of interest being proportional to the lifetime of a flow and the velocity of the vehicle relative to its current position, without limitation; (4) PMHS updates local geo-connectivity database 506 when response 510 is received from IVCA Gateway; (5) PMHS sends network measurement to IVCA gateway: For each of a plurality of service providers, it requests, to collect metrics e.g. 381 to 389 as in FIG. 3, and appends the vehicle's identifier, location and timestamp with request. Measurements are then performed and stored at both PMHS and IVCA gateway, as in step 520; (6) PMHS computes presence of approaching network holes H, for each of a plurality of provider network paths P, by analyzing data in the geo-connectivity database, as in step 530; (7) PMHS computes the set of application flow types A(H,P) that will be adversely impacted by next approaching network hole H, if placed on a first provider network path P as in 540; (8) PMHS Control process computes the clock time T after which all new flows of type found in the set A(H,P) will be placed on a provider path other than P, and also the best path Q other than P, taking into account the speed and direction of the vehicle as in 550; (9) When the clock time reaches T, any new flows detected by the PMHS and which is of a type that belongs to set A(H,P) will be placed on the best alternate path Q instead of P as in 560.

Summary of IVCA Procedures to Build a Statistically Significant Data Set on Geo-Connectivity Across all Geographies One embodiment of the IVCA gateway is 312 as shown in FIG. 3. In FIG. 3 two IVCA gateways are shown for redundancy and fault tolerance, and in this embodiment are hosted in a data center with redundant connections to the global Internet.

Figure 6:
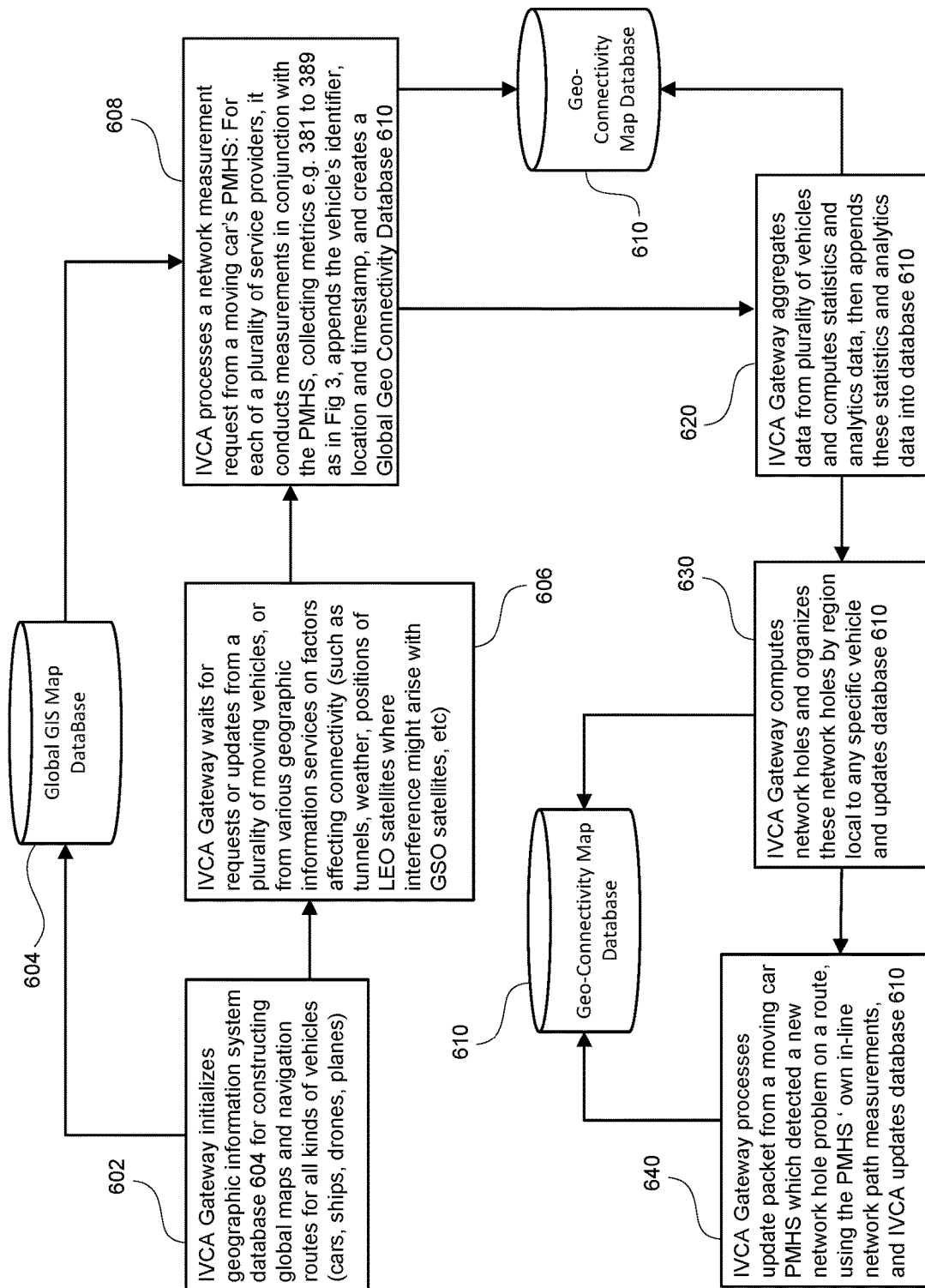
FIG. 6 illustrates an example of an Intelligent Vehicle Connectivity Analytics (IVCA) gateway operation and its use of a crowd-source algorithm to collect network metrics from one or more vehicles reachable via a network, such as the Internet or an equivalent global reach network.

FIG. 6 shows how an example of how the IVCA starts with a geographic information system (GIS) database 604 and uses crowd-sourced network metrics obtained from moving vehicles to compute a geo-connectivity database 610, and then co-operatively assists vehicles on request, to perform predictive flow switching.

Without limitation, a summary of steps taken by the IVCA to accomplish predictive flow switching are:

In step 602, IVCA Gateway initializes geographic information system database 604 for constructing global maps and navigation routes for all kinds of vehicles. As discussed above, vehicles can include, without limitation, cars, motorcycles, trains, ships, drones, and planes, etc.).

In step 606, IVCA Gateway waits for requests or updates from a one or more moving vehicles, or from various geographic information services. Updates can include information on factors affecting network connectivity (e.g., network measurements or measurement data), such information pertaining to tunnels, weather, positions of LEO satellites, or other factors that can affect where interference might arise with GSO satellites, etc.

In step 608, IVCA processes a network measurement request from a moving car's PMHS: For each of a plurality of service providers, it conducts measurements in conjunction with the PMHS, collecting metrics e.g. 381 to 389 as in FIG. 3, appends the vehicle's identifier, location and timestamp, and creates a Global Geo Connectivity Database 610.

In step 620, the IVCA Gateway aggregates data from plurality of vehicles and computes statistics and analytics data, then appends these statistics and analytics data into database 610.

In step 630, the IVCA Gateway computes network holes and organizes these network holes by region local to any specific vehicle and updates database 610.

In step 640, IVCA Gateway processes update packet from a moving car PMHS which detected a new network hole problem on a route, using the PMHS' own in-line network path measurements, and IVCA updates database 610.

Alternative Network Paths Using DSRC and Vehicle-to-Vehicle

Figure 7:
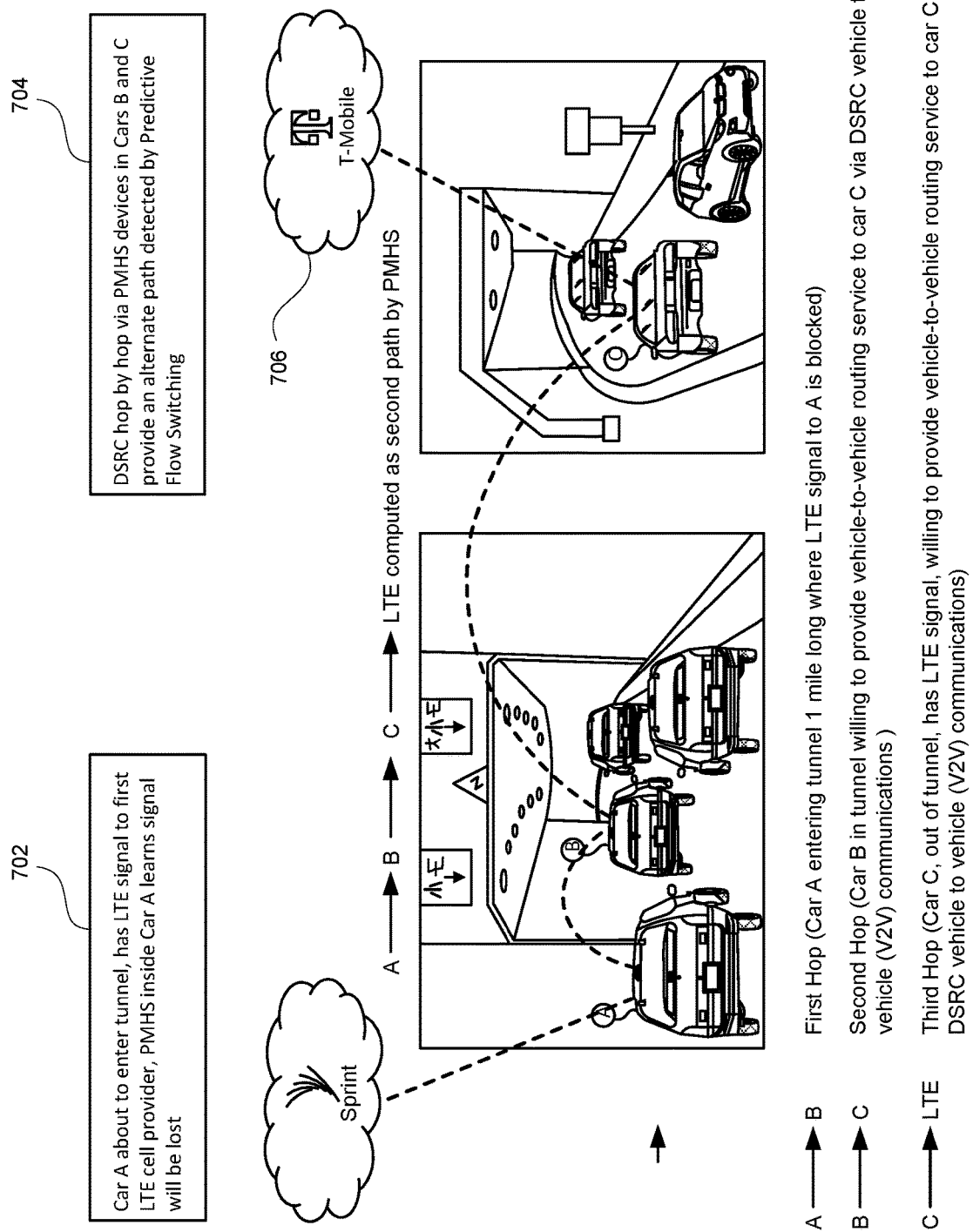
FIG. 7 illustrates one aspect of the invention utilizing vehicle-to-vehicle paths to solve a network hole problem resulting from blocked network access via certain provider path types, such as via satellite signals.

FIG. 7 illustrates a very useful embodiment of the invention where tunnels which block LTE signals are involved, and the PMHS units in multiple vehicles are able to form an alternate path successfully, where Car A, connected to a first provider path as in 702, can effectively be routed via Car C to a second provider path as in 704. Note also that Car A and Car C can be connected to different LTE service providers.

In FIG. 7, second path 704 is made possible by the PMHS using its DSRC interface to compute a Vehicle to Vehicle path, through the tunnel, finally reaching a vehicle C which has a path 706 via LTE to the public Internet.

Alternative Provider Path Via LTE Enabled Tunnels

Figure 8:
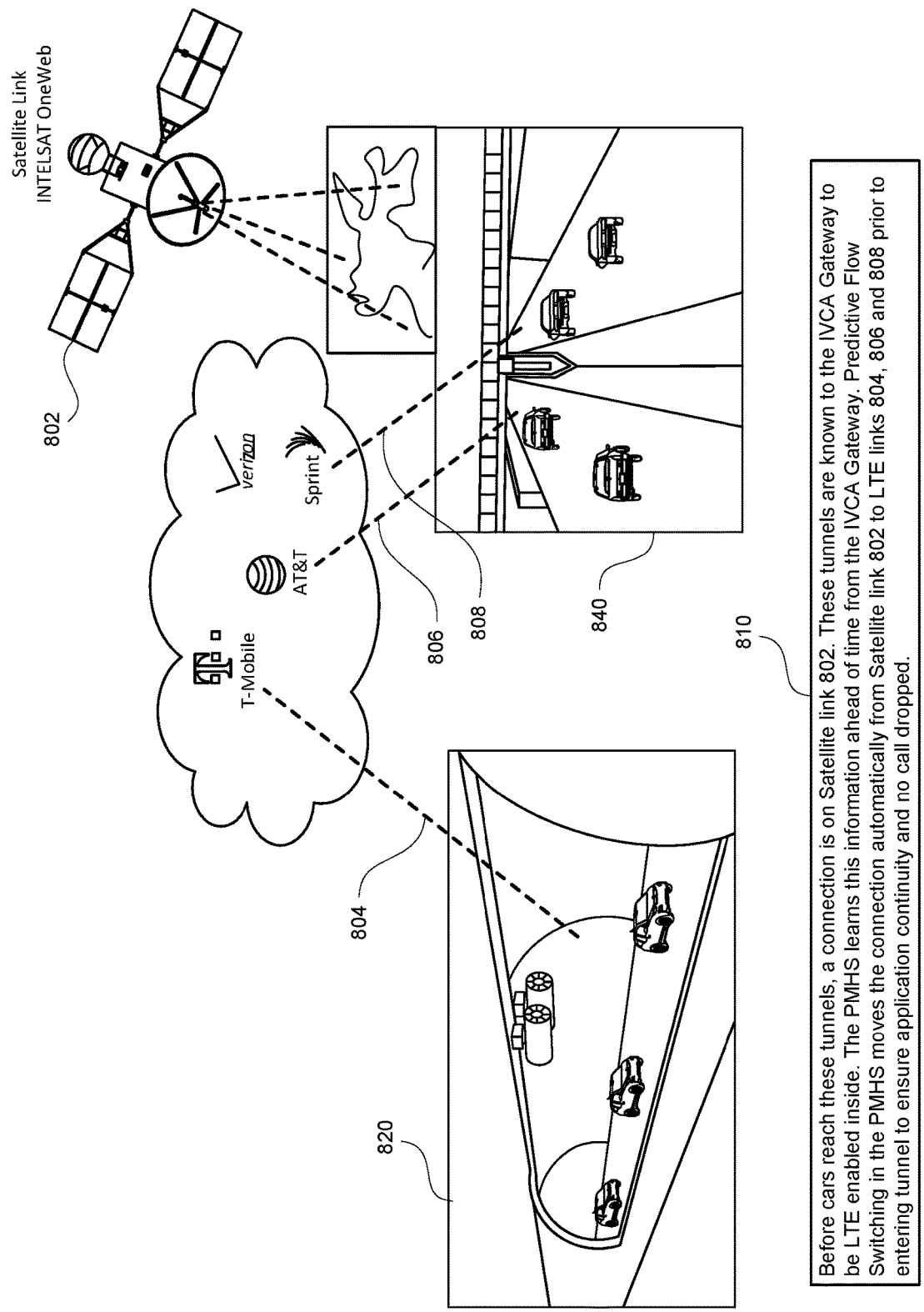
FIG. 8 illustrates one aspect of the invention used to detect road tunnels where Long Term Evolution (LTE) signals are enabled internally, by communicating with an IVCA gateway.

FIG. 8 describes another embodiment of the invention, where the geo connectivity map at the IVCA gateway has been updated with a new topological discovery that the specific tunnels in both examples 820 and 840 are LTE enabled. This information can be obtained either via a geographical information service, or from measurements provided by vehicle PMHS units in their periodic updates to the IVCA, which the IVCA sends to the PMHS in any vehicle when it makes a request for local region network hole data.

In Step 810: Before cars reach these tunnels, a connection is on Satellite link 802. These tunnels are known to the IVCA Gateway to be LTE enabled inside. The PMHS learns this information ahead of time from the IVCA Gateway. Predictive Flow Switching in the PMHS moves the connection automatically from Satellite link 802 to LTE links 804, 806 and 808 prior to entering tunnel to ensure application continuity and no call dropped.

Figure 9:
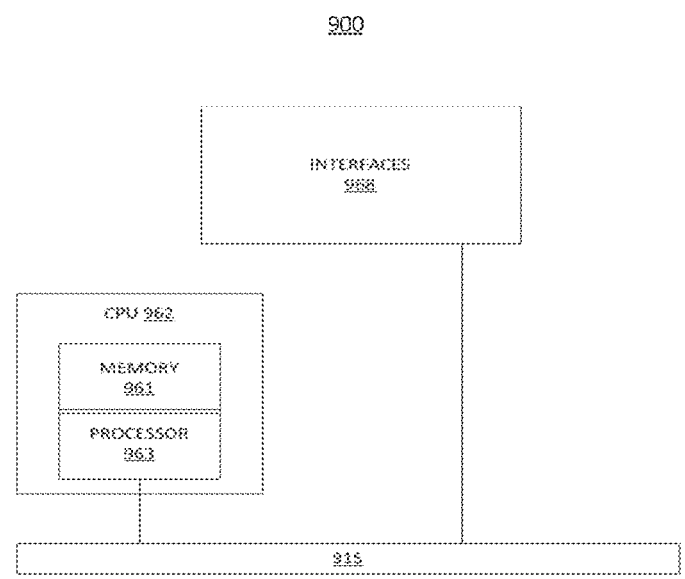
FIG. 9 illustrates a block diagram of hardware components that can be used to implement a PMHS and/or IVCA of the disclosed technology.

FIG. 9 illustrates an example of an electronic device with which some aspects of the technology can be implemented. Specifically, FIG. 9 illustrates various hardware components that could be used to implement either an IVCA or PMHS of the subject technology.

Device 900 includes a master central processing unit (CPU) 962, interfaces 968 (e.g., network interfaces), and a bus 915 (e.g., a PCI bus). When acting under the control of appropriate software or firmware, CPU 962 can be configured to perform operations necessary to collect, store and/or transmit measurement data, including information describing connectivity metrics for at least one network provider (e.g., when configured to function as a PMHS). Alternatively, device 900 may be configured to function as an IVCA gateway, as discussed above, in which case CPU 962 can be configured to aggregate measurement data from a plurality of moving vehicles communicating and conducting network measurements in real time (e.g., describing geo-connectivity for various network providers), and to manage and update a geo-connectivity database based on the received measurement data. CPU 962 can accomplish these functions under the control of software including an operating system and other applications software. CPU 962 can include one or more processors 963 such as a processor from the Motorola family of microprocessors, the ARM family of microprocessors, or the MIPS family of microprocessors. In an alternative embodiment, processor 963 is specially designed hardware for controlling the operations of device 911. In a specific embodiment, a memory 961 (such as non-volatile RAM and/or ROM) also forms part of CPU 962. However, there are many different ways in which memory could be coupled to the system.

The interfaces 968 can be provided as interface cards (sometimes referred to as "line cards"), or wireless interfaces, for example, that are configured to provide wireless network access using one or more RF transceivers. Interfaces 968 control the sending and receiving of data packets over the network and sometimes support other peripherals used with a router. Among the interfaces that can be provided are, without limitation, gigabit Ethernet interfaces, frame relay interfaces, cable interfaces, Digital Subscriber Line (DSL) interfaces, token ring interfaces, WiFi IEEE 802.11a/b/g/n wireless interfaces, DSRC IEEE 802.11p wireless interfaces, Geo Stationary Satellite (GSO) interfaces, Low Earth Orbit (LEO) Satellite interfaces, and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 962 to efficiently perform routing computations, network diagnostics, security functions, etc.

Although the device shown in FIG. 9 is one example device of the present invention, it is by no means the only network device architecture on which the present invention can be implemented. For example, an architecture having a single processor that handles communications as well as routing computations, etc. is often used. Further, other types of interfaces and media could also be used with the router.

Regardless of the network device's configuration, it may employ one or more memories or memory modules (including memory 961) configured to store program instructions for the general-purpose network operations and mechanisms for roaming, route optimization and routing functions described herein. The program instructions may control the operation of an operating system, the operations required of a network control plane processor, the operations required of a network forward plane processor, and/or one or more applications, for example. The memory or memories may also be configured to store tables such as application microflow tables, flow lifetime tables, application sensitivity threshold tables, mobility binding, registration, and association tables, and other data pertinent to detection and prediction of network holes.

Although the exemplary embodiment described herein employs storage device 961, it should be appreciated by those skilled in the art that other types of computer readable media which can store data that are accessible by a computer, such as magnetic cassettes, flash memory cards, digital versatile disks, cartridges, random access memories (RAMs), read only memory (ROM), a cable or wireless signal containing a bit stream and the like, may also be used in the exemplary operating environment. Non-transitory computer-readable storage media expressly exclude media such as energy, carrier signals, electromagnetic waves, and transitory signals per se.

To enable user interaction with the computing device 900, interfaces 968 can represents any number of input mechanisms, such as a microphone for speech, a touch-sensitive screen for gesture or graphical input, keyboard, mouse, motion input, speech and so forth. Interfaces 968 can also represent one or more output devices or mechanisms known to those of skill in the art. In some instances, multimodal systems enable a user to provide multiple types of input to communicate with device 900.

For clarity of explanation, the illustrative system embodiment is presented as including individual functional blocks including functional blocks labeled as a "processor" or processor 963. The functions these blocks represent may be provided through the use of either shared or dedicated hardware, including, but not limited to, hardware capable of executing software and hardware, such as a processor 963, that is purpose-built to operate as an equivalent to software executing on a general purpose processor. For example, the functions of one or more processors may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) for storing software performing the operations discussed below, and random access memory (RAM) for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer; (2) a sequence of computer implemented steps, operations, or procedures running on a specific-use programmable circuit; and/or (3) interconnected machine modules or program engines within the programmable circuits. The system 968 can practice all or part of the recited methods, can be a part of the recited systems, and/or can operate according to instructions in the recited non-transitory computer-readable storage media. Such logical operations can be implemented as modules configured to control the CPU 962 or processor 963 can be configured to perform particular functions according to the programming of the module. By way of example, one or more processors can be configured to execute operations including: receiving measurement data comprising one or more connectivity metrics for at least one network provider, and updating a geo-connectivity database using the received measurement data.

In some aspects, processor 963 can be further configured to perform operations for transmitting a geo-connectivity request to an Intelligent Vehicle Connectivity Analytics (IVCA) gateway, and receiving a geo-connectivity reply from an IVCA gateway, the geo-connectivity reply comprising information regarding network availability for the at least one network provider along a vehicle path. In some aspects, processor 963 may be configured to perform operations for computing a presence of one or more network holes on the vehicle path based on the geo-connectivity reply, and identifying a threshold time, after which, new network traffic flows are directed to an available provider path, based on the one or more network holes on the vehicle path. In some aspects, processor 963 may be configured to perform operations for computing a presence of one or more network holes on the vehicle path based on the geo-connectivity reply; and identifying one or more existing network traffic flows for migration to a different provider path, based on the one or more network holes. As discussed above, the threshold time can be based on one or more of: the vehicle path, a vehicle direction, or a vehicle speed. Additionally, computing the presence of one or more network holes can be performed for each of a plurality of provider paths.

It is understood that any specific order or hierarchy of steps in the processes disclosed is an illustration of exemplary approaches. Based upon design preferences, it is understood that the specific order or hierarchy of steps in the processes may be rearranged, or that only a portion of the illustrated steps be performed. Some of the steps may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more."

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

What is claimed is:

1. A mobile predictive multi-homing system, comprising:
    a network interface coupled to one or more processors, the network interface configured for communication with at least one computer network; and
    a non-transitory computer-readable medium coupled to the one or more processors, the non-transitory computer-readable medium comprising computer instructions stored therein, which when executed by the one or more processors, cause the one or more processors to perform operations comprising:
        determining a first location of the mobile predictive multi-homing system;
        computing first connectivity metrics for a first network provider at the first location;
        computing second connectivity metrics for a second network provider at the first location;
        computing a first path routing decision based on the first connectivity metrics and the second connectivity metrics;
        updating a locally stored geo-connectivity database based on the on first connectivity metrics and the second connectivity metrics;
        determining a second location of the mobile predictive multi-homing system;
        computing updated first connectivity metrics for the first network provider at the second location;
        computing updated second connectivity metrics for the second network provider at the second location; and
        updating the locally stored geo-connectivity database based on the updated first connectivity metrics, the updated second connectivity metrics, and the second location.

2. A geo-connectivity map maintenance system, comprising:
    a network interface coupled to one or more processors, the network interface configured for communication with at least one computer network; and
    a non-transitory computer-readable medium coupled to the one or more processors, the non-transitory computer-readable medium comprising computer instructions stored therein, which when executed by the one or more processors, cause the one or more processors to perform operations comprising:
        receiving a first set of network metrics from a first mobile predictive multi-homing system, wherein the first set of network metrics comprises connectivity metrics for a first network provider at a first location;
        receiving a second set of network metrics from a second mobile predictive multi-homing system, wherein the second set of network metrics comprises connectivity metrics for a second network provider at the first location;
        updating a high-definition geolocation connectivity database based on one or more of the first set of network metrics, or the second set of network metrics; and
        sending a geo-connectivity update to a third mobile predictive multi-homing system, wherein the geo-connectivity update is configured to facilitate a network selection process by the third mobile predictive multi-homing system at the first location.

3. The geo-connectivity map maintenance system of claim 2, wherein the one or more processors are further configured to perform operations comprising:
    receiving a third set of network metrics from the first mobile predictive multi-homing system, wherein the third set of network metrics comprises connectivity metrics for the first network provider at a second location; and
    receiving a fourth set of network metrics from the second mobile predictive multi-homing system, wherein the second set of network metrics comprises connectivity metrics for the second network provider at the second location, wherein the first location is different than the second location.

* * * * *